(12) United States Patent
Howard et al.

(10) Patent No.: US 12,077,899 B2
(45) Date of Patent: Sep. 3, 2024

(54) CLOTHES AIRER

(71) Applicant: VALE MILL (ROCHDALE) LIMITED, Rochdale (GB)

(72) Inventors: Michael Howard, Rochdale (GB); Mary Widall, Stockport (GB)

(73) Assignee: VALE MILL (ROCHDALE) LIMITED, Rochdale (GB)

( * ) Notice: Subject to any disclaimer, the term of this patent is extended or adjusted under 35 U.S.C. 154(b) by 35 days.

(21) Appl. No.: 17/862,788

(22) Filed: Jul. 12, 2022

(65) Prior Publication Data
US 2023/0027097 A1 Jan. 26, 2023

(30) Foreign Application Priority Data

Jul. 13, 2021 (GB) ..................................... 2110067
Feb. 28, 2022 (GB) ..................................... 2202745

(51) Int. Cl.
| | | |
|---|---|---|
| *D06F 57/08* | (2006.01) | |
| *C09D 5/38* | (2006.01) | |
| *C09D 7/61* | (2018.01) | |
| *C09D 7/65* | (2018.01) | |
| *C09D 163/00* | (2006.01) | |
| *C09D 167/00* | (2006.01) | |

(52) U.S. Cl.
CPC ............... *D06F 57/08* (2013.01); *C09D 5/38* (2013.01); *C09D 7/61* (2018.01); *C09D 7/65* (2018.01); *C09D 163/00* (2013.01); *C09D 167/00* (2013.01)

(58) Field of Classification Search
CPC .. D06F 57/08; C09D 7/61; C09D 7/65; C09D 5/38; C09D 163/00; C09D 167/00
See application file for complete search history.

(56) References Cited

U.S. PATENT DOCUMENTS

| | | | | |
|---|---|---|---|---|
| 7,172,081 | B2* | 2/2007 | Trowsdale | D06F 57/10 |
| | | | | 211/202 |
| 8,100,274 | B2* | 1/2012 | Trowsdale | D06F 57/08 |
| | | | | 211/195 |
| 2005/0009698 | A1* | 1/2005 | Foster | B41M 5/44 |
| | | | | 503/201 |
| 2014/0183148 | A1* | 7/2014 | Ho | A47J 47/16 |
| | | | | 211/49.1 |

(Continued)

FOREIGN PATENT DOCUMENTS

| | | | | |
|---|---|---|---|---|
| CH | 630675 | A5 * | 6/1982 | ............ D06F 57/08 |
| CN | 105671888 | | 6/2016 | |
| CN | 105671892 | | 6/2016 | |

(Continued)

OTHER PUBLICATIONS

Office Action issued in Chinese Patent Application No. 202221808233.0 dated Sep. 22, 2022.

(Continued)

*Primary Examiner* — Patrick D Hawn
(74) *Attorney, Agent, or Firm* — NIXON & VANDERHYE

(57) ABSTRACT

Disclosed is a clothes airer includes two spaced apart frame members and a plurality of hanging rails which extend between the frame members, at least the hanging rails being provided with a coating, such as a coating of poly fluoride wax, that defines a slip resistant surface.

10 Claims, 2 Drawing Sheets

(56) References Cited

U.S. PATENT DOCUMENTS

2015/0144580 A1\* 5/2015 Kitano .................... F24S 25/10
                                                        211/41.17

FOREIGN PATENT DOCUMENTS

| CN | 105671894 | | 6/2016 | | |
|---|---|---|---|---|---|
| CN | 105696276 | | 6/2016 | | |
| CN | 107136880 | A | 9/2017 | | |
| CN | 107245285 | A | 10/2017 | | |
| EP | 1627948 | A1 | 2/2006 | | |
| EP | 1 627 948 | B1 | 9/2007 | | |
| GB | 2202139 | A \* | 9/1988 | ............ | D06F 57/08 |
| GB | 2522489 | A \* | 7/2015 | ............ | D06F 57/08 |
| JP | H07178869 | A \* | 7/1995 | ............... | C08K 3/36 |
| KR | 200419458 | Y1 \* | 6/2006 | ............ | D06F 57/08 |
| KR | 20100063295 | A \* | 6/2010 | ............ | D06F 57/08 |
| KR | 10-2014-0024779 | | 3/2014 | | |
| KR | 20160069358 | A \* | 6/2016 | ............ | D06F 57/08 |
| KR | 10-1680880 | B1 | 11/2016 | | |
| WO | WO-2006018075 | A1 \* | 2/2006 | ............ | D06F 57/08 |
| WO | WO-2008039086 | A2 \* | 4/2008 | ............ | D06F 57/06 |

OTHER PUBLICATIONS

Extended European Search Report and Search Opinion issued in European Patent Application No. 22020324.4 dated Dec. 12, 2022.
Search Report for GB2202745.2, dated Apr. 21, 2022, 1 page.
Office Action, issued in Chinese Patent Application No. 202210824808.6 dated Nov. 15, 2023.

\* cited by examiner

CLOTHES AIRER

CROSS REFERENCE TO RELATED APPLICATIONS

This application claims priority to GB Patent Application No. 2110067.2 filed Jul. 13, 2021, and GB Patent Application No. 2202745.2 filed Feb. 28, 2022, the entire contents of each of which are hereby incorporated by reference.

BACKGROUND OF THE INVENTION

Field of the Invention

This invention relates to a clothes airer and in particular, though not exclusively, to a clothes airer of the type comprising two frame members which are spaced apart and inter-connected by a plurality of rails from which laundry items may be hung.

Description of the Related Art

More particular, but not exclusively, the invention relates to a clothes airer comprising two support frames which are inter-connected by at least a plurality of hanging rails and wherein each support frame comprises at least two frame members which are pivotally mounted relative to one another. Examples of clothes airers of the type to which the present invention relates are to be found in the specifications of our UK patents GB2367239B, GB2560415B and GB2563107B.

Airers of the aforedescribed type typically are portable and employed indoors for the drying of laundry but occasionally are positioned outdoors. In use when loading an airer with laundry items care is needed to ensure that the weight of a laundry item hanging from over one side of a rail substantially equals the weight of the other part of the item hanging over the other side of the rail. That is particularly important when an airer is used in an external environment so as to ensure that even in light winds a laundry item is less likely to be displaced and fall to the ground.

Clips such as clothes pegs may be employed to ensure that laundry items remain in place on a rail but their use is undesirably time consuming.

More generally, in addition to convenience of use it is important that use of a clothes area does not result in any damage to laundry items.

SUMMARY OF THE INVENTION

The present invention seeks to provide an improved clothes airer which affords an improved resistance to laundry items slipping from a support rail when not carefully balanced over a rail.

In accordance with one aspect of the present invention there is provided a clothes airer comprising two spaced apart frame members and a plurality of hanging rails which extend between the frame members, at least said hanging rails being provided with a coating that defines a slip resistant surface.

The coating may be of a type that provides a textured and or matt finish.

The invention is particularly but not exclusively directed to the coating of hanging rails of a small diameter, such as a diameter of 5 mm or less. In addition to hanging rails of small diameter other components of the airer such as at least that part of a frame member that serves also as a hanging position, may be provided with a coating that defines a slip resistant surface.

A suitable coating comprises poly fluoride wax, preferably a concentration of poly fluoride wax of between 1% and 2% by weight, more preferably between 1% and 1.5% by weight. A percentage of 1.4% has been found particularly effective for providing a rail surface that affords an improved resistance to slippage of laundry items and without any significant risk of damage to the laundry items.

The coating may, for example, comprise one or more of the other ingredients listed in the table referred to below in the context of an embodiment of the present invention. Although it is required that the hanging rails are coated in order to provide an improved slip-resistance, the invention teaches that the whole of a preformed assembly or sub-assembly of the frame members and hanging rails may be provided with a slip resistant coating such as a coating comprising poly fluoride wax. The hanging rails and at least some other parts of the airer may be provided with the same coating.

Typically the coating may be formed by spraying electrostatically charged powder onto the clothes airer component(s) and then heating in an oven to provide a coherent coating which preferably is firmly bonded to the underlying material of the frame members and hanging rail.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
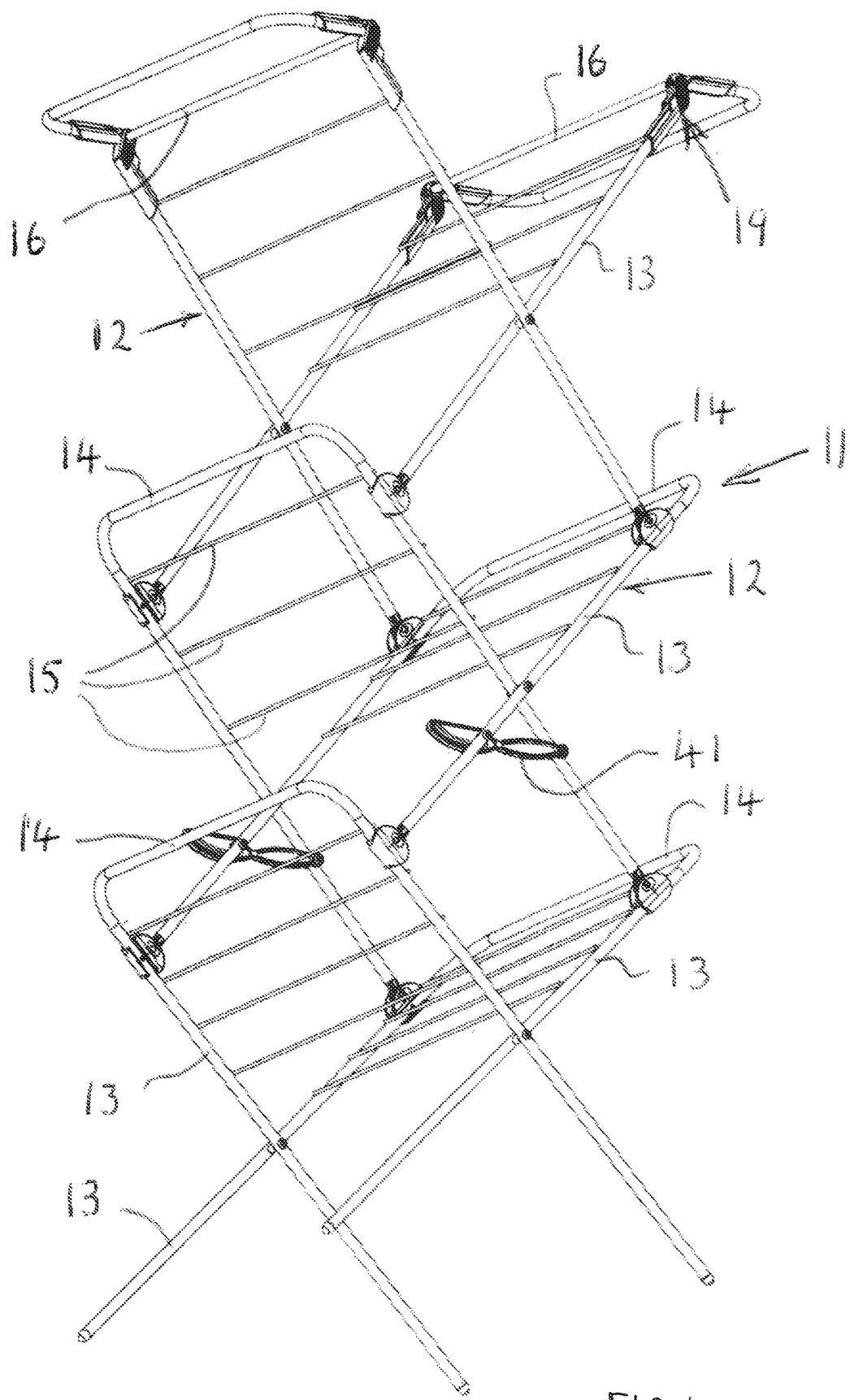
FIG. 1 is a perspective view of a clothes airer in accordance with a first embodiment of the present invention.

A collapsible airer 10 (see FIG. 1) of the so-called three-tiered type comprises a main frame 11 formed of a pair of substantially identical side frame assemblies 12 which each comprise relatively pivotable side frame members 13.

The two side frame assemblies are spaced apart by a plurality of hanging rails 14,15 which in use of the airer extend substantially horizontally between the side frame assemblies.

Each outermost hanging rail 14 of the lowermost and intermediate tier is integral with a pair of side frame members 13 and in this embodiment each said rail 14 and pair of side members 13 are formed from a single length of bent metal tube.

Other, inward, hanging rails 15 of a lighter construction extend between the side frame members.

For the uppermost tier the outermost edge rails 16 are not formed integrally with the side frame members 13. Instead they are secured to the side frame members by moulded plastic hinge units 19.

The outermost hanging rails 14 are of a cross-section corresponding to that of the side frame members 13 and greater than the cross-section of the hanging rails 15 Typically the outer hanging rails 14 and side frame members 13 are of a tubular construction whereas the hanging rails 15 of light construction typically are formed from relatively stiff steel wire.

Conventional locking arms 41 hold the side frame assemblies in the position shown in FIG. 1 but may be released to allow the airer to be collapsed for storage. Other details of an airer of this type are described in GB2563107A.

In this embodiment the hanging rails 14 are secured to side frame members to form a sub-assembly which is then provided with a slip resistant coating comprising poly fluoride wax. Subsequently a plurality of the sub-assemblies are inter-connected by means of conventional plastics components and hinges that provide a pivotal connection between the tiered sub-frames.

In this embodiment of the invention the coating comprises the following ingredients namely:—

| Main Ingredients (Generic Name) | Concentration (Weight Percentage) |
|---|---|
| Epoxy resin | 29.0% |
| Polyester resin | 29.0% |
| Barium sulphate | 25.1% |
| Titanium pigment (Ti02) | 12.5% |
| Poly fluoride wax | 1.4% |
| Polyethylene wax | 0.8% |
| Red pigment * | 0.12% |
| Black pigment * | 0.85% |
| Yellow pigment * | 0.23% |
| Aluminium powder | 1.0% |

* Other colour pigments may readily be employed without adversely affecting the slip resistance of the surface of the coating.

The aforementioned composition is applied in conventional manner for creating a powder coated finish. By the use of this coating the hanging rails are provided a matt and textured surface finish that exhibits a beneficial slip resistance to assist in securely restraining laundry items from slipping down from a hanging rail.

Figure 2:
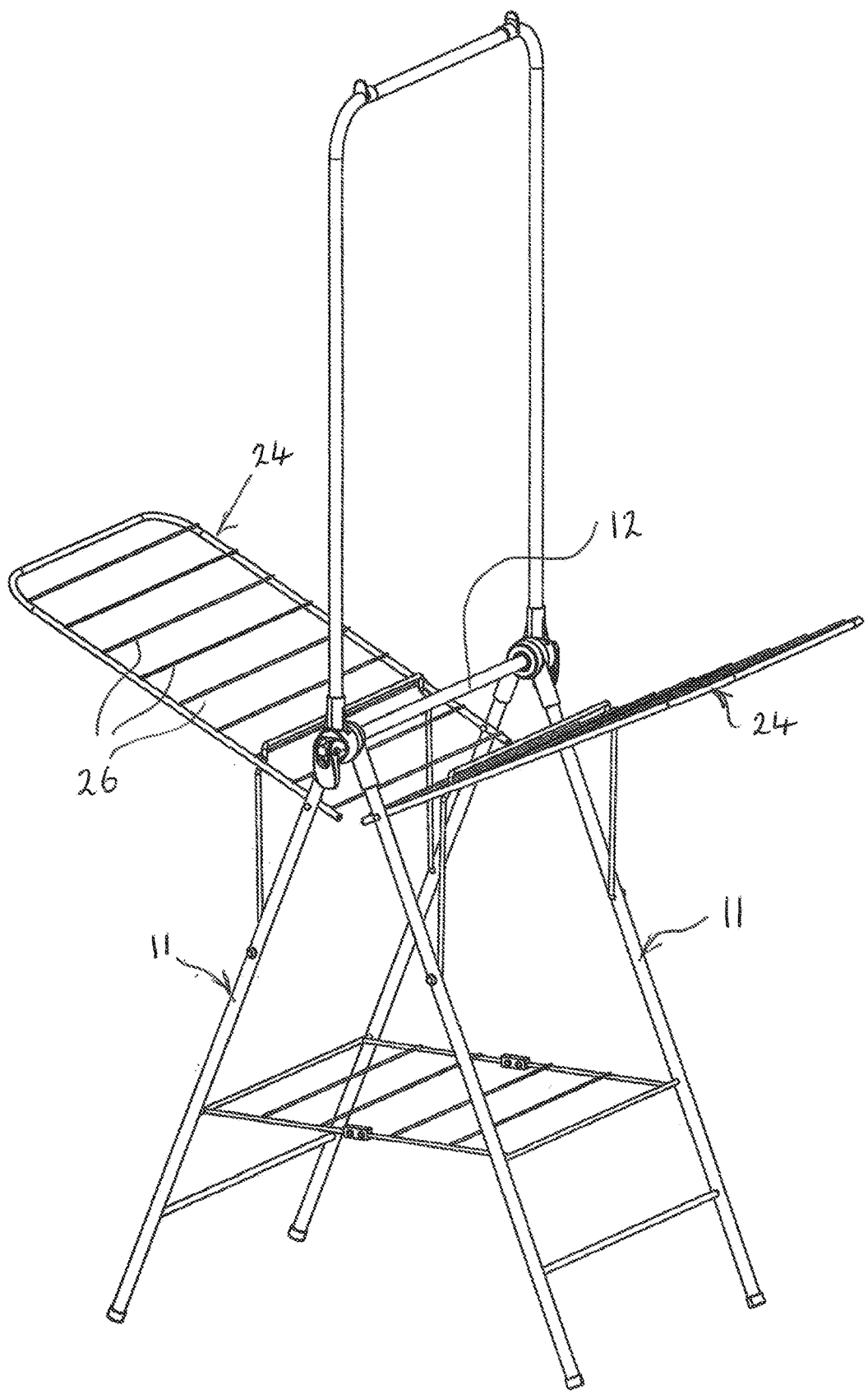
FIG. 2 is a perspective view of a clothes airer in accordance with a second embodiment of the present invention.

Although the present invention is particularly applicable to an airer of the so-called three tiered type it may be employed also for other clothes airers, such as described in more detail in the specification of our UK patent GB 2560415B and comprising a pair of leg frames 11 (see FIG. 2) which are pivotally mounted relative to one another about an axle 12 and provides support for side frames 24.

Each side frame comprises a plurality of laundry support rails 26 and in this embodiment of the invention each of the support rails 26 is provided with the coating corresponding to that described in respect of the first embodiment of the invention, said coating being provided prior to securing the rails in position relative to the side frames 24. Optionally the leg frames as well as the hanging rails may be provided with the slip resistant coating.

Although the composition of the coating may be varied from that specifically described herein, the coating nevertheless beneficially may contain poly fluoride wax in order to provide the desired slip resistance, more particularly a coating comprising poly fluoride wax in the aforedescribed ranges or that of 1.4% by weight thereby to provide an advantageous degree of slip resistance without significantly inhibiting the ease of removal of laundry items subsequent to drying. That also avoids the risk of damage to laundry items such as might arise if a higher percentage of poly fluoride wax is present in the coating.

The invention claimed is:

1. A clothes airer comprising two spaced apart frame members and a plurality of hanging rails which extend between the frame members, at least said hanging rails being provided with a coating that defines a slip resistant surface,
   wherein the coating comprises poly fluoride wax, and
   wherein the hanging rails of the airer have a powder coated finish.

2. The clothes airer according to claim 1 wherein the coating comprises at least 1% poly fluoride wax by weight.

3. The clothes airer according to claim 2 wherein the coating comprises between 1% and 2% poly fluoride wax by weight.

4. The clothes airer according claim 1 wherein the coating comprises between 1% and 1.5% poly fluoride wax by weight.

5. The clothes airer according to claim 4 where in the coating comprises 1.4% poly fluoride wax by weight.

6. The clothes airer according claim 1 wherein in addition to poly fluoride wax the coating comprises one or more of an epoxy resin, polyester resin, barium sulphate, titanium pigment, poly ethylene wax, aluminium powder and colouring pigment.

7. The clothes airer according to claim 1 wherein the coating provides a textured finish.

8. The clothes airer according to claim 1 wherein the coating provides a matt finish.

9. The clothes airer according to claim 1 wherein at least a part of the clothes airer additional to the hanging rails is provided with the same coating as that provided on the hanging rails.

10. The clothes airer according to claim 1 wherein the hanging rails have a diameter of 5 mm or less.

* * * * *